Dec. 20, 1949 W. D. ABBOTT 2,491,943
MOTOR VENTILATION
Filed July 30, 1948

WITNESSES:
Edward Michaels
Nw. C. Groome

INVENTOR
Ward D. Abbott.
BY O. D. Buchanan
ATTORNEY

Patented Dec. 20, 1949

2,491,943

UNITED STATES PATENT OFFICE 2,491,943

MOTOR VENTILATION

Ward D. Abbott, Orchard Park, N. Y., assignor to Westinghouse Electric Corporation, East Pittsburgh, Pa., a corporation of Pennsylvania Application July 30, 1948, Serial No. 41,690

6 Claims. (Cl. 171—252)

My invention relates to the ventilation of dynamo-electric machines, and it has particular relation to an improvement in the ventilation of a certain type of commercial general-purpose motor which has square-sided stator-punchings having rounded corners which make contact with a circular cylindrical frame-ring, thereby defining axially extending ventilating-spaces between the flat sides of the stator-punchings and the frame-ring.

The object of my invention is to provide special duct-means for improving the heat-transfer from the flat sides of the stator-punchings directly to the frame-ring.

Figure 1:
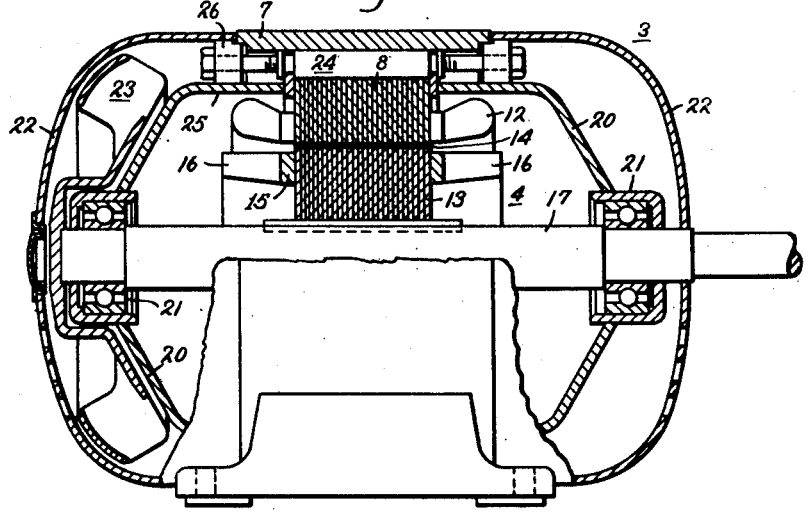
Figure 2:
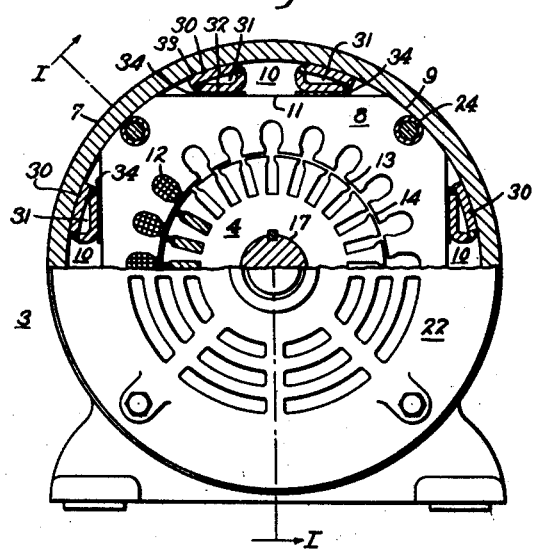

With the foregoing and other objects in view, my invention consists in the structures, combinations, assemblies, parts and methods of design and operation hereinafter described and claimed, and illustrated in the accompanying drawing, wherein:

Figure 1 is a longitudinal sectional view of a totally enclosed, fan-cooled motor embodying my invention, the section-plane being indicated at I—I in Fig. 2, and Fig. 2 is an end view of the motor shown in Fig. 1, with the top half cut away to show a central transverse sectional view of the top half of the motor.

While my invention is not limited to totally enclosed, fan-cooled motors, being equally applicable to other types of dynamo-electric machines, it has been illustrated in connection with a totally enclosed, fan-cooled motor because of the greater urgency of the need for better heat-transfer conditions in these enclosed motors.

The illustrated motor comprises a stator-member 3 and a rotor-member 4. The stator-member 3 comprises a strong, rigid frame-ring 7 of circular cylindrical shape, which constitutes an imperforate enclosure-ring for the machine. The stator-member also comprise a stator-core comprising a rigidly held stack of stator-laminations 8, the outer periphery of which is preferably square, as shown in Fig. 2, with rounded corners 9 which fit within the inside of the frame-ring 7, so as to make contact with said frame-ring at only a few spaced points around the periphery of the core, thereby providing four intermediate, axially disposed ventilating-ducts 10 between the flat sides 11 of the stator-laminations 8 and the frame-ring 7.

The inner periphery of the stator-laminations 8 carries a stator-winding 12. The inner periphery of the stator-laminations 8 is separated from the outer periphery of the rotor-core 13 of the rotor-member 4, by an airgap 14. The outer periphery of the rotor-core 13 is provided with a squirrel-cage winding 15, in the illustrated form of embodiment of my invention, and the squirrel-cage winding 15 is shown as being cast, with integrally cast fan-blades 16 projecting axially outwardly therefrom, at each end of the squirrel-cage member. The rotor-core 13 is carried by a shaft 17 which also constitutes a part of the rotor-member 4.

The stator-member 3 of the motor comprises a suitable form of end-bracket construction for rotatably supporting the shaft 7 and for ventilating the motor, according to the particular type of ventilation which is adopted for any particular motor. Since the illustrated motor is a totally enclosed, fan-ventilated motor, it has two sets of end-brackets at each end of the machine, namely inner, imperforate brackets 20 which make contact with the ends of the stack of stator-laminations 8, near the outer periphery thereof, so as to totally enclose the working parts of the motor. These inner brackets 20 carry the bearings 21 which support the shaft 17. The illustrated motor also has outer end-brackets, which are shown in the form of hoods 22, which make contact with the ends of the frame-ring 7, and extend around over the inner brackets 20 with a ventilating-space therebetween. Disposed within the ventilating-space within the hood 22 at one end of the machine, is an axial-flow fan 23 which is carried by the shaft 17 of the rotor-member, and which extends into the space between that hood 22 and the inner bracket 20 at that end of the machine, so as to maintain a gas-flow, usually air, flowing axially through the four axially disposed ventilating-ducts 10 between the stator-laminations 8 and the frame-ring 7.

In the particular motor shown, the stack of stator-laminations 8 is held in rigid assembly by means of a locking-bar construction 24, disposed at each of the rounded corners 9 of the laminations, as more particularly described and claimed in an application of Goodwin et al., Serial No. 690,629, filed August 15, 1946, now Patent No. 2,447,645, patented August 24, 1948.

The illustrated motor also embodies a convertible-frame feature, one part of which involves a particular construction of the inner brackets 20 whereby the core-engaging part of each of these inner brackets is at the end of a cylindrical bracket-portion 25 which is provided with spaced outwardly extending lugs 26 which serve to properly space and center the inner bracket 20 with respect to the frame-ring 7 and the corresponding hood 22. The convertible-frame construction is a construction whereby different kinds of end-brackets (not shown) can be substituted for the illustrated end-bracket assembly, so that differently ventilated motor-types can be made, with the same essential frame and core parts, as more particularly described and claimed in an application of Ludwig et al., Serial No. 690,628, filed August 15, 1946.

The motor which has thus far been described in detail is old. It operates by a flow of ventilating-air which is forced by the fan 23 through each of the four ventilating-ducts 10 between the outer periphery of the stator-laminations 8 and the inner periphery of the frame-ring 7, so that heat will flow in two principal paths. One heat-flow path is directly from the rounded corners 9 of the stator-laminations 8, into the frame-ring 7 at the four points of contact between these corners and the ring, and thence from the ring to both the outer air and the internally circulated air which flows through the axially extending ventilating-ducts 10. The other heat-flow path of this general type of motor is from the flat sides 11 of the stack of stator-laminations 8 directly to the axially flowing ventilating-air in the four ventilating-ducts 10 between these flat sides of the laminations and the inner periphery of the frame-ring 7.

My present invention is concerned with means for providing a direct heat-flow path from each of the flat sides 11 of the stator-laminations directly to the frame-ring 7, from whence the heat can be dissipated either to the external air or to the axial ventilating-flow, or by both means. According to my invention, I provide a plurality of duct-members 30 which are disposed within the four axially extending ventilating-ducts 10 between the flat sides 11 of the stator-laminations 8 and the inner periphery of the frame-ring 7. Each of the duct-members 30 has a completely encompassing, molecularly integral wall of heat-conducting material, defining an axially extending duct 31 within each duct-member 30. By "molecularly integral," I refer to any construction which is effectively a one-piece construction, whether welded or brazed into one piece, or cast or extruded in one piece, such one-piece or molecularly integral construction being necessary to facilitate the heat-flow. These duct-members 30 are of special contour, having a flat wall 32 which is disposed in good, broad-surfaced heat-exchanging relation to the flat-sided outer periphery 11 of the stator-core 8. Each duct-member 30 also has a cylindrically curved wall 33 which is disposed in good, broad-surfaced heat-exchanging relation to the inner periphery of the frame-ring 7.

In one form of embodiment of my invention, I first lay, over the flat side 11 of the stack of perforations, a thin shim 34 of heat-conducting sheet-material, which is disposed between the periphery of the stack of stator-laminations and each of the associated flat walls 32 of the several duct-members 30, for the purpose of improving the heat-transfer contact with the edges of the stator-laminations 8. This shim 34 is made of a soft material that will be extruded or cut by high punchings in an unevenly stacked core, thereby spreading the contact over more than just the high punchings.

Preferably, in practicing my invention, I make the duct-members 30 smaller than the four axially extending ventilating-ducts 10 between the flat sides 11 of the stator-punchings 8 and the flat ring 7. In the illustrated form of embodiment of my invention, two of these duct-members 30 are disposed in each of the four axially extending ventilating-ducts 10, the two duct-members 30 being pressed into the pointed portions of the segmental duct 10 which is defined by the straight side 11 of the laminations 8 and the curved side of the frame-ring 7, as clearly shown in Fig. 2. In this way, the duct-members 30 subdivide the segmental ducts 10 into a plurality of axially extending ducts, while the walls of the duct-members 30 constitute additional heat-transfer paths for conducting heat both to the axially flowing ventilating-air and from the stator-laminations 8 directly to the outer frame 7.

Experience has shown that my herein-claimed heat-dissipation means and methods materially reduce the running temperatures of the motors in which my special duct-members 30 are included. Since these special duct-members may be made of aluminum or other relatively inexpensive light-weight metal, it will be obvious that I have effected an improvement in efficiency of the motor, without any very great increase in either the cost or the weight of the motor.

While I have illustrated my invention, and described its method of application, in only a single preferred form of embodiment, and in connection with only a single type of motor which has been chosen for illustration, I wish it to be understood that my invention is susceptible of considerable modification, by way of additions, omissions, and the substitution of equivalents, without departing from the essential spirit of the invention. I desire, therefore, that the appended claims shall be accorded the broadest construction consistent with their language.

I claim as my invention:

1. A dynamo-electric machine comprising a stator-member and a rotor-member; said stator-member having a rigid frame-ring, a stator-core comprising a rigidly held stack of stator-laminations fitting within the inside of the frame-ring, said stator-core making contact with the frame-ring at only a few spaced points around the periphery of the core, thereby providing intermediate, axially disposed ventilating-ducts between the stator-core and the frame-ring, and a plurality of duct-members disposed within said ventilating-ducts, each duct-member having a completely encompassing, molecularly integral wall of heat-conducting material, defining an axially extending duct, two walls of each duct-member being in good, broad-surfaced heat-exchanging relation to the outer periphery of the stator-core and the inner periphery of the frame-ring, respectively; and means for maintaining a gas-flow through said axially extending ducts.

2. The invention as defined in claim 1, in combination with thin shims of heat-conducting sheet-material disposed between the periphery of the stack of stator-laminations and the associated walls of the several duct-members.

3. The invention as defined in claim 1, characterized by each duct-member filling only a portion of one of the axially disposed ventilating-ducts between the stator-core and the frame-ring.

4. The invention as defined in claim 1, characterized by the outer periphery of said stack of stator-laminations being substantially square with rounded corners at the contact-making points with the frame-ring.

5. The invention as defined in claim 1, characterized by the outer periphery of said stack of stator-laminations being substantially square, with rounded corners at the contact-making points with the frame-ring, in combination with thin shims of heat-conducting sheet-material disposed between the periphery of the stack of stator-laminations and the associated walls of the several duct-members.

6. The invention as defined in claim 1, characterized by the outer periphery of said stack of stator-laminations being substantially square, with rounded corners at the contact-making points with the frame-ring, and further characterized by each duct-member filling only a portion of one of the axially disposed ventilating-ducts between the stator-core and the frame-ring.

WARD D. ABBOTT.

REFERENCES CITED

The following references are of record in the file of this patent:

UNITED STATES PATENTS

| Number | Name | Date |
| --- | --- | --- |
| 1,762,455 | Preedit | June 10, 1930 |
| 2,062,470 | Mossay | Dec. 1, 1936 |